Patented May 24, 1949

2,470,757

UNITED STATES PATENT OFFICE 2,470,757

INTERPOLYMER OF MONOVINYLAROMATIC COMPOUND, MONOCARBOXYLIC OLEFINIC ACID AND DRYING OIL OR ACID

Edward G. Bobalek, Cleveland, Ohio, assignor to The Arco Company, Cleveland, Ohio, a corporation of Ohio No Drawing. Application June 2, 1947, Serial No. 751,965

12 Claims. (Cl. 260—23)

The present invention relates to a novel type of interpolymer, produced from (1) a monovinylaromatic compound, (2) a monocarboxylic olefinic acid having a carbon chain length up to four carbon atoms exclusive of carboxyl groups, and (3) an at least partially conjugated drying oil fatty acid or ester, said polymer having free carboxyl groups esterified with a polyhydric alcohol. The invention is further concerned with a process by which the new polymer is prepared, and with surface coatings and films produced therefrom.

The product of the present invention is produced by the interpolymerization of (a) a monovinylaromatic compound, (b) a monocarboxylic olefinic acid having a carbon chain length up to four carbon atoms exclusive of carboxyl groups, and (c) a compound selected from at least partially conjugated drying oil fatty acids and esters having a specific degree of unsaturation. These reactants are first polymerized together to a point short of gelation, and the resulting interpolymer then reacted with a polyhydric alcohol to esterify free carboxyl groups of the basic structure.

This resinous polymer has been found to be an exceptionally desirable surface-coating material, inasmuch as films produced therefrom are glossy, exceedingly tough, and retentive of adhesion under conditions of atmospheric exposure. Films formed from the resinous polymer exhibit greater resistance to water, alkali, and checking due to variation in weather conditions than do ordinary oleoresinous varnishes or oil-modified glyceryl-phthalate resins. The product is compatible with common varnish and paint solvents, showing excellent color and clarity in solutions thereof. Paints and varnishes embodying the product of the present invention exhibit a rapid air-drying or baking time, with a preferred application being in the field of baking enamels.

By "monovinylaromatic compound," as employed in this specification is meant a compound containing at least a phenyl or naphthyl radical in combination with a vinyl group, and otherwise structurally similar to styrene. The phenyl group may contain substituents, as, for example, fluorine, chlorine, methoxy, hydroxy, methyl, trichloromethyl, or trifluoromethyl. As representative compounds included within the scope of "monovinylaromatic compound" may be mentioned styrene itself, para-methylstyrene, para-chlorostyrene, para-fluorostyrene, meta-chlorostyrene, meta-fluorostyrene, meta- and para-trichloromethylstyrene, meta- and para-trifluoromethylstyrene, the ortho- and meta-hydroxystyrenes, methoxystyrenes, vinylnaphthalene, and the like. Substituents may also be present on the vinyl group, as in alpha-methylstyrene, but of course not in a manner such as to retard polymerization. Especially preferred monovinylaromatic compounds are the styrene derivatives, and particularly styrene itself, alpha-methylstyrene, and fluorostyrene.

The monocarboxylic olefinic acid employed in the method of the present invention contains a single olefinic carbon-carbon linkage and the carboxyl group as sole functional group, at least one hydrogen atom on the beta-carbon, an aliphatic chain length up to four carbon atoms exclusive of carboxyl groups, and may contain substituents, e. g., methyl, phenyl, or a halogen, on a chain carbon atom. As representative olefinic acids may be mentioned crotonic acid, methacrylic acid, acrylic acid, cinnamic acid, and alpha-chloroacrylic acid. Esters and aldehydes are not operative for the production of the desired results, and the invention is therefore limited to the employment of the previously characterized olefinic acids.

The at least partially conjugated drying oil or oil fatty acid may be any one of the at least partially conjugated drying oils, which usually exist chiefly as the glycerides of certain complex unsaturated straight-chain organic acids, the oil fatty acids themselves, or synthetic esters of the drying oil fatty acids. The conjugated drying oil or acid, to be operative in the method of the present invention, should have an average double bond content, as determined by iodine number (which is the experimental measure of unsaturation) at least as great as that for dehydrated castor oil (a minimum of approximately 133 Woburn) according to specifications and examples published by J. D. von Mikusch and Charles Frazier, Ind. Eng. Chem., Anal. Ed. 13, 782–789 (1941); 15, 109–113 (1943), but should have an iodine number no greater than that of beta-eleostearic acid (approximately 274 Woburn). As ordinarily obtained from commercial sources, the drying oils consist chiefly of glycerides of the drying oil fatty acids, which acids may be liberated from the oils by saponification and acidulation of separated acid salts. The oil acids thus obtained may, if desired, be esterified with monohydric or polyhydric alcohols according to usual esterification procedures. These esters are usually referred to as synthetic drying oil esters, and are similar to the natural oil in many respects. Ordinarily, these natural fatty acid glyceride esters, the natural drying oil fatty acids, or various synthetic esters of the same, are processed by commercial suppliers according to various procedures which effect an average double bond content and degree of conjugation such as to render the processed oils or acids suitable for employment in the present invention. Either the oil, the acid, or synthetic esters may be employed in the method of the present invention. The procedure when the oil fatty acids are employed is somewhat more facile than when the esters are employed, inasmuch as the tendency toward gelation is considerably less. Mixtures of drying oils, or of oils with acids, may also be employed, but, whether in the pure or mixed state, the requirement for conjugation remains the same. Drying oils and acids having a greater or lesser average double bond content than that prescribed above are unsuited for use, and if the necessary unsaturation is not present in the oil or acid as introduced into the reaction zone, then heating or other reaction conditions must be sufficient to produce the same therein. As representative drying oils and acids which may be employed, for example, are dehydrated castor oil, conjugated linseed oil fatty acids, isomerized walnut oil, linseed oil fatty acids, conjugated soya oil, and blends of these conjugated oils and acids with oils such as soya and castor.

The specifications of a typical oil fatty acid which may be advantageously employed in the procedure of the present invention are as follows:

1. Iodine No_____ 143-153 (WIJS)
   178-187 (Woburn)
2. Color _____ 1-2
3. Acid No_____ 197.5 to 199
4. Saponification No___ 198.5 to 199.5
5. Ester value _____ 0-1.5
6. Hexabromide value_ 0-3
7. WIJS on ice for 3 minutes iodine value _____ 115-120 (62-73 Woburn)
8. Conjugation (by difference) _____ 60-65
9. Titre value _____ 18-24
10. Spec. gravity _____ 0.9201 at 25° C.
11. Viscosity _____ A+ to F (Gardner-Holdt scale at 77° F.)

The first step in the method of the present invention essentially comprises the admixture of (a) from about 10 to 60 per cent by weight of a monovinylaromatic compound monomer, (b) from about 2 to 25 per cent by weight of the monovinylaromatic compound of a monocarboxylic olefinic acid having a carbon chain length up to four carbon atoms, exclusive of carboxyl groups, and (c) a compound selected from drying oil fatty acids and esters having an average double bond content, as determined by iodine number, at least as great as that of dehydrated castor oil and not in excess of that of beta-eleostearic acid, preferably in the presence of an addition polymerization catalyst such as benzoyl peroxide, ditertiarybutyl peroxide, or oxygen. The reaction mixture is heated together at a polymerization temperature between about 100 and 180 degrees centigrade, preferably between about 130 and 160 degrees centigrade, for a period of time sufficient to produce a non-gelled resinous product having a viscosity generally in excess of about K on the Gardner-Holdt scale at 77 degrees Fahrenheit.

The polymerization usually demands a time of about two to eight hours at the preferred temperatures given, with the period being correspondingly decreased or increased by the employment of higher or lower temperatures, respectively. For example, while the reaction period is usually between about two and eight hours when a temperature of 130 to 160 degrees centigrade is employed, reduction of the reaction temperature to about 100 degrees centigrade usually demands an increase in the reaction period to about 10 to 12 hours.

A preferred manner of conducting the interpolymerization is to admix the starting reactants at a temperature below about 130 degrees centigrade, and thereafter to raise the temperature slowly over a period of about one-half to two hours to about 180 degrees centigrade, whereafter it may be rapidly elevated to between 200 and 250 degrees centigrade, preferably to about 220 degrees centigrade, and an inert gas, e. g., nitrogen or carbon dioxide, blown through the mixture of reaction products to remove unreacted monovinylaromatic compound and olefinic acid monomers. If the preferred procedure given above is not employed, the mixture of reaction products may be gas-blown at a somewhat more elevated temperature at the end of the reaction period, or the monomer may be removed in any other suitable manner, if desired, such as by distillation. In general, if the reaction mixture has attained a viscosity indicating the proximate gelation of the interpolymer product, it is desirable to eliminate the unreacted volatile monomers by distillation or with a current of inert gas at temperatures less than about 200 degrees centigrade prior to admixture of the polyhydric alcohol and elevation of the temperature to the preferred ranges for esterification. In instances where the time of attainment of the gelation viscosity is remote, the unreacted monomers can be eliminated during the subsequent esterification stage of the process, and a special step to remove unreacted monomers prior to addition of the polyhydric alcohol becomes entirely unnecessary.

As polyhydric alcohol for the esterification may be employed, for example, ethylene glycol, glycerol, pentaerythritol, polyallyl alcohol, mannitol, sorbitol, erythritol, trimethylol propane, and similar other compounds containing at least two and not more than six hydroxyl groups. The polyhydric alcohol employed usually contains in excess of two hydroxyl groups, as this allows for greater cross-linkage possibilities. It is desirable to employ a quantity of the polyhydric alcohol in excess of the amount theoretically required to neutralize the free carboxyl groups in the primary interpolymer, and ordinarily sufficient of the alcohol to render the ratio of hydroxyl groups in the alcohol to carboxyl groups in the basic polymer between about 1.1 to 2.0 to one, preferably between 1.1 and 1.6 to one. Otherwise expressed, the amount of polyhydric alcohol employed should be sufficient to render the acid value of the esterified polymer below about 40, and preferably below about 10. The esterification, of course, is always checked at a point short of gelation of the resin, and a convenient manner of accomplishing this objective is by dilution of the resin to a solution of 50 per cent solids in a solvent such as xylene or mineral spirits.

The esterification may be accomplished by any conventional procedure therefor, but is advantageously conducted by heating the basic interpolymer with the selected polyhydric alcohol, preferably in the presence of an esterification catalyst, such as litharge or calcium stearate, at a resin-forming temperature, e. g., 100–290 degrees usually between about 130 and 250 degrees centigrade, preferably at about 220–250 degrees centigrade, until an acid value of less than 40 has been attained in the esterified product. A current of carbon dioxide, nitrogen, or other inert gas may be passed through the mixture during the esterification to assist in removal of water, at a rate determined by foaming of the reaction mixture.

If desired, a solvent such as toluene, xylene, dipentene, or moderately low-boiling aliphatic hydrocarbons may also be incorporated into either the polymerization or the esterification mixture, and the reaction conducted under temperature conditions regulated according to the maximum volume of reflux which can be controlled in the particular apparatus employed. The reaction container may, for example, be provided with a reflux condenser having a receiver whereby the mixed solvent-water condensate is collected and whereby the separated water may be withdrawn while the solvent is returned to the reaction container at a rate sufficient to replace the quantity removed by distillation. In such operation, carbon dioxide or other inert gas is not used, except perhaps as a protective blanket to inhibit oxidation. Although the solvent process as above outlined may be employed successfully in a few instances, it is, however, generally either entirely inoperative or productive of a much less desirable product than can be derived by the fusion method.

The following examples are given to illustrate the practice of the present invention, but are not to be construed as limiting.

*Example 1*

A mixture of 280 grams of dehydrated castor oil, having a viscosity of U-V on the Gardner-Holdt scale at 77 degrees Fahrenheit, 37 grams of cinnamic acid, 250 grams of styrene, and 6 grams of benzoyl peroxide were introduced into a three-neck, one-liter flask provided with a mechanical stirrer, reflux condenser, and thermometer. The mixture was then heated at a temperature of 130 to 150 degrees centigrade for a period of one hour, whereafter the reaction mixture was cooled. The reaction product gave cloudy solutions with common solvents, and exhibited poor film-forming properties.

To the above reaction product was added 30 grams of glycerol and 3 grams of calcuim stearate. The reflux condenser was removed, and, while a current of carbon dioxide was passed through the mixture, the reaction temperature was elevated to between 220 and 240 degrees centigrade, where it was maintained until the acid value was less than 25 and drops of resin, when chilled on glass, were clear and of a gummy texture. The reaction was checked short of gelation by dilution of the resin to a 60 per cent solution of non-volatile solids with a petroleum hydrocarbon solvent having a boiling range between about 150 and 200 degrees centigrade.

Films drawn from the above reaction product and baked for one-half hour at 250 degrees Fahrenheit exhibited excellent toughness, adhesion, and gloss. The resin was especially adapted for use in air-drying or baking enamels, and films based on the resin were characterized by superior exterior durability and excellent color retention under baking or weathering conditions.

*Example 2*

A mixture of 280 grams of linseed oil fatty acids, 312 grams of styrene, 30 grams of methacrylic acid, and six grams of benzoyl peroxide were introduced into a three-neck one-liter flask and the reaction mixture then heated under reflux conditions at a temperature between about 110 and 140 degrees centigrade until the product had a viscosity of K-L on the Gardner-Holdt scale at 77 degrees Fahrenheit. This consumed a period of six hours. The reaction product was then cooled, and was found to be cloudy in common solvents to have inferior film-forming properties.

The reflux condenser was then removed from the reaction apparatus, and 56 grams of glycerol and three grams of calcium stearate were added. A stream of carbon dioxide was blown through the reaction mixture while the temperature was elevated to and maintained at 190 to 235 degrees centigrade. This temperature was maintained until a drop of the resin, when cooled on glass, showed no cloudiness and the resin had attained an acid value of less than 30. The reaction was checked short of gelation by dilution of the resin to a sixty per cent solution of non-volatile solids with a petroleum hydrocarbon solvent having a boiling range between 150 and 200 degrees centigrade.

The resinous product exhibited excellent film-forming characteristics when used in the ordinary types of air-drying or baking enamel or varnish compositions.

*Example 3*

The process of Example 2 is repeated, using instead of glycerol, 45 grams of pentaerythritol. The product produced from this procedure is very similar to that of Example 2.

*Example 4*

The procedure of Example 2 is repeated, using instead of the styrene, 350 grams of para-fluorostyrene. The resinous reaction product is similar to that of Example 2, and possesses additional durability and resistance to water, alkali and general exposure.

*Example 5*

The procedure of Example 2 is repeated, employing instead of the styrene, an equal amount of alpha-methyl-styrene. The product of the reaction is a resinous interpolymer very similar in character to that of Example 2.

Coating compositions prepared from the polymer of the present invention and a number of driers, pigments, and resins are especially suitable for employment as varnishes and baking enamels, inasmuch as films formed therefrom exhibit excellent toughness, durability, and resistance to alkali, water and exposure. Driers which may be advantageously incorporated with the interpolymer are metallic naphthenates, such as those of cobalt, manganese and lead. As pigments that may be used with the said coatings may be mentioned titanium dioxide, zinc oxide, and iron blue. Among the resins which may be advantageously employed in combination with the interpolymer of the present invention, to allow production of a surface coating having superior characteristics, are included oil-soluble phenol-aldehyde resins, melamine or urea resins, pentaerythritol esters of rosin, ester gum, and, in general, many other hard varnish resins. Such a resin is preferably employed in a minor proportion, e. g., in amount up to about 30 per cent by weight of the mixture.

For the preparation of surface coatings from the interpolymer of the present invention, the resin may be diluted to any desirable extent with a common varnish solvent, mineral spirits and xylene being somewhat preferred. The concentration should usually be between about 50 to 60 per cent of non-volatile solids, and films produced from such solutions have been found especially desirable. The exact concentration employed, however, is not significant, as it has been found that variation of the solids content over a reasonable range does not materially affect the quality of the films.

Various modifications may be made in the invention without departing from the spirit or scope thereof, and it is to be understood that I limit myself only as defined in the appended claims.

I claim:

1. An ungelled resinous interpolymer formed from about 10 to 60 per cent by weight of (a) a monovinylaromatic compound selected from the group consisting of styrene, vinylnaphthalene, fluorostyrene, chlorostyrene, methoxystyrene, hydroxystyrene, methylstyrene, trichloromethylstyrene, trifluoromethylstyrene, and alphamethylstyrene, (b) a monocarboxylic olefinic acid containing a single olefinic carbon-carbon linkage and the carboxyl group as sole functional group, at least one hydrogen atom on the beta-carbon, and an aliphatic carbon chain length up to four carbon atoms, exclusive of carboxyl groups, in amount from about 2 to 25 per cent by weight of the monovinylaromatic compound (a), the remainder being (c) a compound selected from the group consisting of drying oils and drying oil fatty acids having an average double bond content, as determined by Woburn iodine number, between about 133 and 274.

2. A process for the production of a resinous interpolymer which includes the step of polymerizing, by heating at a temperature between about 100 and 180 degrees centrigrade, from about 10 to 60 percent by weight of (a) a monovinylaromatic compound selected from the group consisting of styrene, vinylnaphthalene, fluorostyrene, chlorostyrene, methoxystyrene, hydroxystyrene, methylstyrene, trichloromethylstyrene, trifluoromethylstyrene, and alpha-methylstyrene, (b) a monocarboxylic olefinic acid containing a single olefinic carbon-carbon linkage and the carboxyl group as sole functional group, at least one hydrogen on the beta-carbon, and an aliphatic carbon chain length up to four carbon atoms, exclusive of carboxyl groups, in amount from about 2 to 25 percent by weight of the monovinylaromatic compound (a), the remainder being (c) a compound selected from the group consisting of drying oils and drying oil fatty acids having an average double bond content, as determined by Woburn iodine number, between about 133 and 274.

3. The product of claim 1, wherein free carboxyl groups of the interpolymer are esterified with a polyhydric alcohol, containing as sole functional groups at least 2 and not more than 6 hydroxyl groups per molecule, to an acid value below forty.

4. The product of claim 1, wherein the monovinylaromatic compound (a) is styrene.

5. The process of claim 2, wherein the monovinylaromatic compound (a) is styrene.

6. The process of claim 2, wherein the interpolymer is thereafter esterified to an acid value below 40 with a polyhydric alcohol containing hydroxyl groups as sole functional groups and not more than six hydroxyl groups per molecule at a temperature between 130 and 250 degrees centigrade.

7. The process of claim 2, wherein unreacted monomers are removed from the resinous reaction product.

8. The process of claim 2, wherein the polymerization is effected in the presence of an addition polymerization catalyst selected from the group consisting of peroxygen addition polymerization catalysts and oxygen.

9. The product of claim 1, wherein the monovinylaromatic compound (a) is styrene and the olefinic acid (b) is methacrylic acid.

10. The product of claim 1, wherein the monovinylaromatic compound (a) is styrene, the olefinic acid (b) is methacrylic acid, and wherein free carboxyl groups of the interpolymer are esterified to an acid number less than 40 with a polyhydric alcohol containing hydroxyl groups as sole functional groups and not more than six hydroxyl groups per molecule.

11. The product of claim 1, wherein the monovinylaromatic compound (a) is styrene and the olefinic acid (b) is cinnamic acid.

12. The product of claim 1, wherein the monovinylaromatic compound (a) is styrene and the olefinic acid (b) is cinnamic acid, and wherein free carboxyl groups of the interpolymer are esterified to an acid number less than 40 with a polyhydric alcohol containing hydroxyl groups as sole functional groups and not more than six hydroxyl groups per molecule.

EDWARD G. BOBALEK.

No references cited.